April 18, 1967  E. H. WILEY  3,314,331
PHOTOGRAPHIC PROJECTION SYSTEM AND LAMP
Filed April 29, 1965
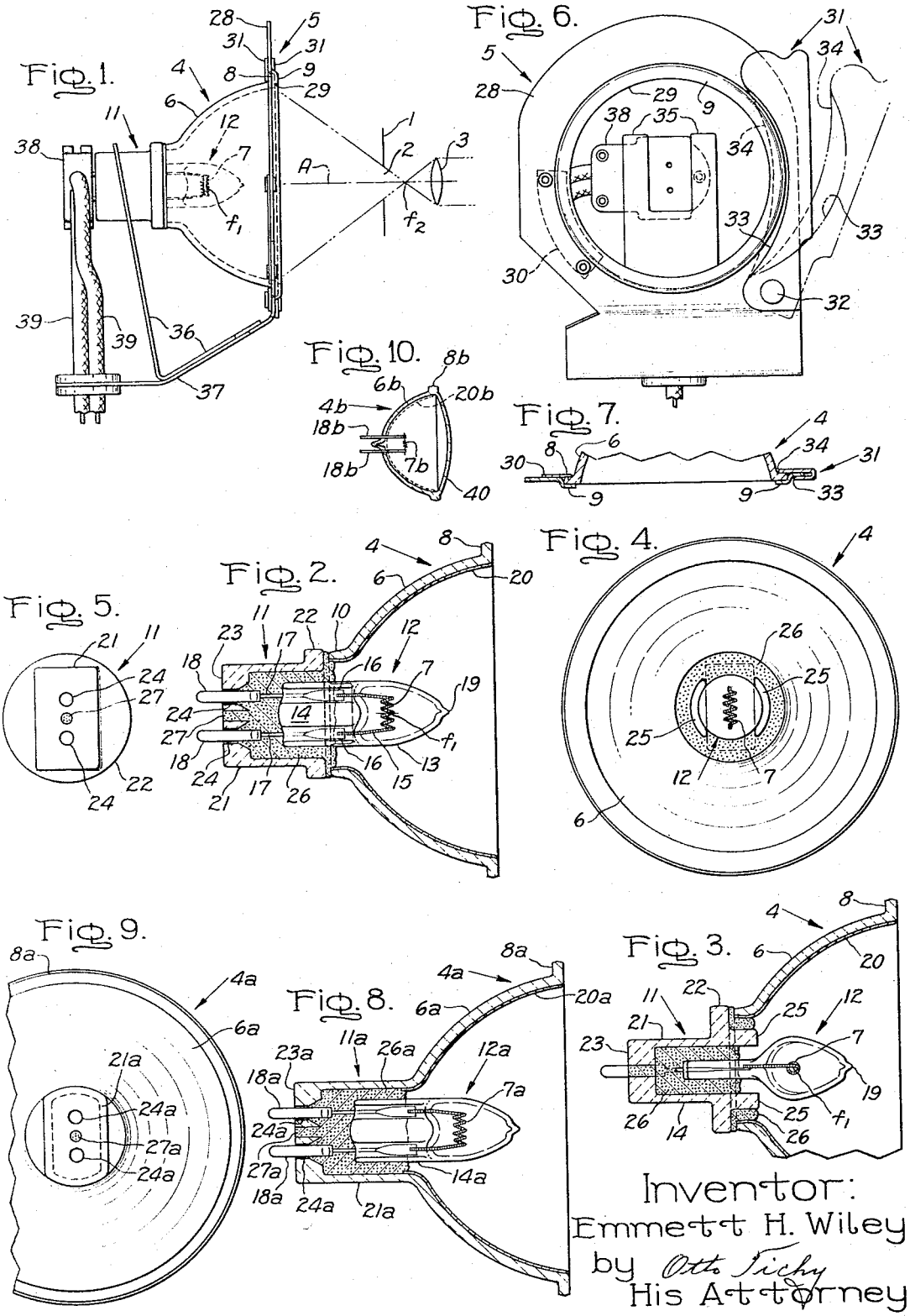
Inventor:
Emmett H. Wiley
by Otto Tichy
His Attorney

United States Patent Office 3,314,331
Patented Apr. 18, 1967

3,314,331
PHOTOGRAPHIC PROJECTION SYSTEM AND LAMP
Emmett H. Wiley, Chesterland, Ohio, assignor to General Electric Company, a corporation of New York
Filed Apr. 29, 1965, Ser. No. 451,874
11 Claims. (Cl. 88—24)

This invention relates to photographic projection systems useful, for example, in movie projectors, and to a novel lamp unit especially useful in the system.

In portable movie projector systems, it has been the practice to employ a lamp comprising a tubular bulb containing a filament and having a base at one end thereof for mounting in a suitable socket. In many systems, a spherical reflector behind the lamp reflects the rearwardly directed light back upon the filament, and condensing lenses at the front of the lamp concentrate the light upon the aperture in the film gate. After passing through the film at said aperture, the light then passes through projection lenses for enlargement of the film image. In recent years, in some cases a shallow elliptical condensing reflector has been incorporated within the lamp bulb to concentrate the light directly upon the film aperture.

In the prior art systems, the lamp filament was mounted as accurately as possible with respect to the base of the lamp, and the lamp socket was mounted in the projector in as accurate a relation as possible to the film aperture, as were also the condensing lenses and reflector. However, the lamp filament and the condensing mirror, when used, was located an appreciable distance from the lamp base and from the socket which was also located an appreciable distance from the film aperture, both vertically and laterally. Thereby, slight inaccuracies in the location of any of the cooperating elements were multiplied by virtue of the relatively large distances or spacings. This is especially true of 8 mm. movie systems employing a lamp with an enclosed condensing reflector. Also, if the locating surfaces are placed at greater spacings in order to minimize angular positional errors, the size of the base-socket combination increases which is contrary to the needs of a portable device.

It is therefore an object of the present invention to provide a projection system which affords a very high degree of accuracy of placement of the light source relative to the film aperture as well as a very high degree of utilization of the light and a very compact or small unit.

In accordance with one aspect of the invention, the objectives are achieved by means of a novel lamp unit comprising a light-concentrating reflector having an annular flange at its mouth or rim and which has fixedly mounted therein a light source which is located in accurate predetermined relationship to the focus of the reflector and to its flange, together with support or holder means including an annular seating shoulder which is located in a fixed predetermined relationship to the film aperture and which supports the lamp unit by engagement of the said flange on the reflector of the lamp unit with said seating shoulder. Intermediate reference points are eliminated, the lamp unit is mounted in close proximity to the lens aperture, and a high degree of utilization of the light and a minimal system size is attained.

Further features and advantages of the invention will appear from the following detailed description and from the drawing wherein:

FIG. 1 is an elevation, in part diagrammatic, of a movie projector system in accordance with the invention, and showing the lamp unit and its support in full size;

FIGS. 2 and 3 are enlarged side and top views; in section, of a lamp unit comprising the invention;

FIG. 4 is a front view of the lamp unit;

FIG. 5 is a rear view of the base portion of the FIG. 2 unit;

FIG. 6 is an elevation, from the front, of the lamp-supporting structure shown in FIG. 1;

FIG. 7 is a fragmentary horizontal section of portions of the lamp unit and the supporting structure;

FIGS. 8 and 9 are a side elevation, in section, and a rear view of a modified lamp unit; and FIG. 10 is a side elevation, in section, of another form of lamp unit.

Referring to FIG. 1 of the drawing, there are illustrated the elements of an optical system for a portable motion picture projector, wherein the film gate is represented at 1 with its film aperture 2, and the projection lens at 3, the illumination being supplied by a lamp unit 4 carried by a support member 5. The lamp unit comprises a reflector portion 6, preferably of ellipsoidal shape, having a light source 7 at its near focus $f1$ for concentrating a beam of light upon a film in the aperture 2 and toward the far focus $f2$. The reflector 6 has an annular flange 8 (see also FIG. 2) by which the lamp unit is supported against an annular seating shoulder 9 in the support member 5.

Referring to FIGS. 2 to 5, the lamp unit shown therein comprises the glass base reflector 6 having a collar portion 10 at the margin of an opening at its apex and to which is attached a base member 11 which may be of a ceramic insulating material and in which is mounted a light bulb 12 containing a filamentary light source 7.

The light bulb 12 preferably comprises a bulb 13 which may be of fused silica (quartz) or a material consisting essentially of fused silica, such as that known as Vycor, having at one end thereof a flattened pinch seal 14. The filament 7 is preferably a coiled-coil of tungsten wire having single coiled leg portions 15 which extend into the pinch seal 14 where they are welded to extremely thin foil portions 16 of rigid molybdenum lead wires 17 which have their ends enclosed in and welded to hollow metal pin members 18. The bulb 13 is tipped off at its front end 19 after being filled with an inert gas, such as nitrogen, and a quantity of halogen, preferably iodine, although compounds of bromine may be used such as hydrogen bromide. The lamp thereby operates with the now well-known halogen regenerative cycle whereby the bulb walls are maintained clean and free from blackening, for example in accordance with the broader aspects of the teachings of Patent 2,883,571 to Fridrich and Wiley. By way of example, the filament 7 may now be designed to consume 150 watts at 21 volts for a life of about 15 hours in a bulb 13 having a maximum outside diameter of approximately ⅜ inch. The use of such relatively high voltage in a miniature size light bulb is made possible by adaptation of the halogen regenerative cycle principle. The small bulb size avoids obstruction of light reflected from the reflector 6 and which would otherwise have to pass through a large bulb a second time.

The glass base reflector 6 may be coated on its inner surface with a suitable reflecting coating 20, preferably a known type of multiple layer interference film which is highly reflective of visible light and highly transmissive of heat or infrared radiations.

The base member 11 has a main body portion 21 preferably of hollow rectangular form (FIG. 5) having an annular open front end 22 abutting the margin or collar 10 of the reflector opening. The back end of the base member is closed by an end wall 23 having a pair of spaced apertures 24 through which extend the pins 18. At the front end of the base there are a pair of forwardly protruding arcuate lip portions 25 (FIGS. 3 and 4) which preferably fit fairly snugly in the base aperture to generally center the base therein. The light bulb 12 and base 11 are fixedly united with the reflector 6 by a quantity of cement 26. A small amount of the cement is applied to the front face of the annular front end 22 of the base to be between said face and the abutting face of the reflector collar 10. The major quantity of the cement may be injected into the body of the base through a small central aperture 27 in the end wall 23 to embed the pinch portion 14 of the light bulb therein and to flow around the base lips 25 inside the reflector collar 10, whereby to firmly unite the lamp and base to the reflector. Before the cement sets hard, the light bulb 12 is adjusted in all directions (the pins 18 fitting loosely in the base apertures 24) to optically locate the filament 7 at the near focus $f1$ of the reflector 6, the reflector flange 8 being accurately located with respect to said focus $f1$ and, therefore, also with respect to the filament 7. The small compact size of the lamp unit will be appreciated when it is noted that, in a preferred form, the maximum diameter of the flange 8 is approximately 2 inches.

The particular design of the holder shown in FIGS. 1, 6 and 7 is merely illustrative of support means for holding the lamp assembly by its rim in exact predetermined relationship to the film aperture 2, and wherein the lamp unit is quickly removable. The said holder comprises an upstanding sheet metal plate portion 28 having therein an aperture 29 which is bounded by the shoulder portion 9. The flange 8 of the lamp unit 4 is held against the shoulder 9 in part by an arcuate sheet metal strip 30 attached to the plate portion 28 in position to be coextensive with part of the shoulder portion 9 (FIGS. 6 and 7) and form a channel for receiving part of the flange 8. At its other side, the flange 8 is held against shoulder 9 by a movable clip member 31 which is pivoted at its bottom on a pin 32 in plate 28. The clip 31 is bent to a U-shape (FIG. 7) with the edge of one side curved as shown at 33 to clear the shoulder 9, and the other side curved as shown at 34 to clear the main body portion of the reflector 6 but overlie the reflector flange 8. Thus, with the clip 31 swung out, as shown in broken lines in FIG. 6, the lamp unit 4 is inserted to bring the reflector flange 8 against the shoulder 9 and under the strip 30, and the clip 31 is then moved to the closed position shown in full lines to thereby securely clamp the lamp flange as illustrated in FIG. 7. During insertion of the lamp unit into the holder, it is oriented or indexed angularly by placing the base member 11 with its narrow side or lateral dimension between the prong ends 35 of an indexing strip member 36 which extends upwardly from the base plate portion 37 of the holder 5. The lamp filament 7 is thereby oriented to the desired vertical position shown in FIGS. 1 and 2.

Current may be supplied to the lamp filament by a suitable connector member 38 which is clipped to the pins 18 and carries current supply conductors 39.

In the lamp unit 4a shown in FIGS. 8 and 9, parts corresponding to those of the lamp unit shown in FIGS. 1 to 5 are similarly marked with the addition of the letter "a". In this case, the base portion 11a, including its hollow rectangular body portion 21a and end wall 23a, is formed of glass as a unitary part of the reflector portion 6a. The light bulb 12a has a portion of its pinch 14a embedded in cement 26a in the body portion of the base member 11a with its pin terminals 18a extending through apertures 24a in the end wall 23a of the base member, and with its filament 7a located in exact predetermined relationship to the focus of reflector 6a and to the flange 8a at the reflector rim or mouth. The lamp 4a is interchangeable with the lamp 4 in the support member 5 of FIGS. 1, 6 and 7.

The lamp 4b shown in FIG. 10 is illustrative of a sealed beam type unit where in the glass base reflector 6b is a cover glass 40 fusion sealed thereto to constitute the lamp bulb which is evacuated and filled with a suitable inert gas such as nitrogen. The bulb 6b, 40b contains the filament 7b which is mounted on and between suitable pin terminals 18b sealed through the reflector 6b. The flange 8b at the rim of the reflector 6b is accurately formed relative to the location of the filament 7b and the reflector focus to provide for accurate location of the lamp in the support or holder structure 5 of FIGS. 1, 6 and 7. In such a lamp it might be preferable to have the seating plane at the back side of the flange 8b rather than at the front side as is the case with the flange 8 in FIGS. 1 and 2.

It will be evident that the lamp unit 4 illustrated in FIG. 1 is held firmly and with a high degree of accuracy relative to the film gate 1 and aperture 2 by virtue of the engagement of the lamp flange 8 with the seating shoulder 9 of the support member 5, said shoulder 9 being located in a plane parallel to, and a predetermined distance from, the plane of the film gate 1 and aperture 2, and with the axis of said shoulder 9 and the axis of the reflector 6 coincident with the optical axis A of the projection system. The location of the light source or filament 7 of the light bulb 12 is well within the relatively deep reflector 6, thereby further contributing to a high degree of utilization of the light for concentration upon the film aperture 2.

It will further be evident that various modifications, changes and omissions may be made in details of the structures illustrated herein without departing from the spirit and scope of the invention as set forth in the appended claims.

What I claim as new and desire to secure by Letters Patent of the United States is:

1. In a photographic projection system including means providing a film aperture, a projection lens in front of said aperture and light projecting means behind said aperture for concentrating a beam of light therethrough, said light projecting means comprising a compact lamp unit including a concave light-concentrating reflector facing said aperture and having an annular flange at its rim and an opening at its apex, a base member attached fixedly to the back of said reflector at the margin of said opening, said base member having opposite flat sides defining a narrow lateral base dimension, a light source comprising an unbased compact miniature lamp bulb containing a tungsten filament and supported in said base with its filament located in said reflector in fixed predetermined accurate relationship to the focus thereof and to the said flange, said bulb containing a halogen for operation of a tungsten-halogen regenerative cycle which maintains said compact bulb free from blackening, contact members at the rear of said base electrically connected to the filament of said lamp bulb, support means including an annular seating shoulder portion located in fixed predetermined accurate relationship to said film aperture and engageable with the said flange on said reflector, means holding said reflector flange securely against said seating shoulder with said reflector and light source in accurate predetermined relationship to said film aperture, and indexing means carried by said supporting means and engaging the said flat sides of said base member to orient the lamp unit in a predetermined angular position.

2. A system as set forth in claim 1 wherein said base member includes a major portion of generally rectangular cross section the narrow flat sides of which define said narrow lateral base dimension.

3. In a photographic projection system including means providing a film aperture, a projection lens in front of said aperture and light projecting means behind said aperture for concentrating a beam of light therethrough, said light projecting means comprising a compact lamp unit including a concave light-concentrating reflector of glass having thereon a multiple layer interference film which reflects light and transmits heat, said reflector facing said aperture and having an annular flange at its rim and an opening at its apex, a base member attached fixedly to the back of said reflector at the margin of said opening, said base member having opposite flat sides defining a narrow lateral base dimension, a light source comprising an unbased compact miniature lamp bulb containing a tungsten filament and supported fixedly in said base with its filament located in said reflector in fixed predetermined accurate relationship to the focus thereof and to the said flange, said bulb containing a halogen for operation of a tungsten-halogen regenerative cycle which maintains said compact bulb free from blackening, contact members at the rear of said base electrically connected to the filament of said lamp bulb, support means including an annular seating shoulder portion located in fixed predetermined accurate relationship to said film aperture and engageable with the said flange on said reflector, means holding said reflector flange securely against said seating shoulder with said reflector and light source in accurate predetermined relationship to said film aperture, and indexing means carried by said supporting means and engaging the said flat sides of said base member to orient the lamp unit in a predetermined angular position.

4. A system as set forth in claim 3 wherein said base member includes a major portion of generally rectangular cross section the narrow flat sides of which define said narrow lateral base dimension.

5. An electric incandescent projection lamp of compact size for photographic projection systems comprising a concave light-concentrating reflector portion having an annular flange at its rim and an opening at its apex, an insulating base portion fixedly united to the back of the reflector portion at the margin of said opening and having a closed back end with a pair of spaced apertures therethrough, said base member having opposite flat sides defining a narrow lateral base dimension for orienting the lamp angularly in an indexing member, a compact miniature sealed electric lamp bulb containing a tungsten filament connected to lead-in wires extending through a pinch seal end portion of the bulb which extends into said base portion, said lead-in wires terminating in pin portions extending through respective said apertures in the end of said base portion, said bulb containing a halogen for operation of a tungsten-halogen regenerative cycle which maintains said compact bulb free from blackening, and a quantity of cement in said base portion, said pinch seal end portion of the bulb being fixedly embedded in said cement with the filament in said bulb located in a fixed predetermined relationship to the focus of said reflector and to the flange thereon.

6. A lamp as set forth in claim 5 wherein said base member includes a major portion of generally rectangular cross section the narrow flat sides of which define said narrow lateral base dimension.

7. An electric incandescent projection lamp of compact size for photographic projection systems comprising a concave light-concentrating glass base reflector member with a reflecting coating on its inner surface and having an annular flange at its rim and an opening at its apex, a hollow rectangular insulating base member adapted for engagement of its narrow lateral dimension in an indexing means for angular orientation of the lamp, said base having an annular open end abutting the margin of the opening in said reflector and having a closed back end with a pair of spaced apertures therethrough, a compact miniature sealed electric lamp bulb containing a tungsten filament connected to lead-in wires extending through a pinch seal end portion of the bulb which extends into said base member, said lead-in wires terminating in pin portions which extend through respective said apertures in the end of said base member, said bulb containing a halogen for operation of a tungsten-halogen regenerative cycle which maintains said compact bulb free from blackening, and a quanity of cement in said base member and uniting said base member with said reflector member, said pinch seal end portion of the bulb being fixedly embedded in said cement with the filament in said bulb located in a fixed predetermined relationship to the focus of said reflector and to the flange thereon.

8. A lamp as set forth in claim 7 wherein said reflecting coating is a multiple layer interference film which reflects light and transmits heat.

9. An electric incandescent projection lamp of compact size for photographic projection systems comprising a concave light-concentrating glass base reflector member with a reflecting coating on its inner surface and having an opening at its apex with a unitary hollow glass base portion extending rearwardly from the margin of said opening and having a closed back end with a pair of spaced apertures therethrough, said base portion being generally rectangular in cross section and adapted for engagement of its narrow lateral dimension in an indexing means for angular orientation of the lamp, a compact miniature sealed electric lamp bulb containing a tungsten filament connected to lead-in wires extending through a pinch seal portion of the bulb which extends into said base portion, said lead-in wires terminating in pin portions extending through respective said apertures in the end of said base portion, said bulb containing a halogen for operation of a tungsten-halogen regenerative cycle which maintains said compact bulb free from blackening and a quantity of cement in said base portion, said pinch seal end portion of the bulb being fixedly embedded in said cement with the filament in said bulb located in a fixed predetermined relationship to the focus of said reflector and to the flange thereon.

10. A lamp as set forth in claim 9 wherein said reflecting coating is a multiple layer interference film which reflects light and transmits heat.

11. An electric incandescent projection lamp, comprising a concave light-concentrating glass base reflector member with a reflecting coating on its inner surface and having an annular flange at its rim and an opening at its apex, a hollow rectangular insulating base member having an annular open end abutting the margin of the opening in said reflector and having a closed back end with a pair of spaced apertures therethrough, a sealed electric lamp bulb containing a filament connected to lead-in wires extending through a pinch seal end portion of the bulb which extends into said base member, said lead-in wires termintaing in pin portions which extend through respective said apertures in the end of said base member, and a quantity of cement in said base member and uniting said base member with said reflector member, said pinch seal end portion of the bulb being fixedly embedded in said cement with the filament in said bulb located in a fixed predetermined relationship to the focus of said reflector and to the flange thereon, said base member having lip portions projecting forwardly from its annular open end into the opening in said reflector and anchored therein by a portion of said cement.

References Cited by the Examiner

UNITED STATES PATENTS

| | | | |
|---|---|---|---|
| 1,675,380 | 7/1928 | Pund | 313—318 |
| 1,992,041 | 2/1935 | Roper et al. | 240—41 |
| 2,384,624 | 9/1945 | Kingslake et al. | 88—24 |
| 2,627,048 | 1/1953 | Lamb | 313—318 |
| 3,022,438 | 2/1962 | Cooper | 313—222 |
| 3,178,996 | 4/1965 | Anton | 88—24 |
| 3,249,789 | 5/1966 | Preschel et al. | 313—113 |
| 3,250,939 | 5/1966 | Dayton et al. | 313—113 |

NORTON ANSHER, *Primary Examiner.*

R. M. SHEER, *Assistant Examiner.*